US010900228B2

(12) United States Patent
Morita et al.

(10) Patent No.: US 10,900,228 B2
(45) Date of Patent: Jan. 26, 2021

(54) DATA CENTER (71) Applicants: NTT Ltd Japan Corporation, Chiyoda-ku (JP); RagingWire Data Centers, Inc., Sacramento, CA (US)

(72) Inventors: Tomoki Morita, Kawasaki (JP); Kuang Min Tan, Sumida-ku (JP); Naoki Yoshida, Katsushika-ku (JP); Taku Oyama, Ota-ku (JP); Jerry Gilreath, Sacramento, CA (US); James Carlisle, Sacramento, CA (US)

(73) Assignees: NTT Ltd Japan Corporation, Chiyoda-ku (JP); RagingWire Data Centers, Inc., Sacramento, CA (US)

( * ) Notice: Subject to any disclaimer, the term of this patent is extended or adjusted under 35 U.S.C. 154(b) by 0 days.

(21) Appl. No.: 16/181,749

(22) Filed: Nov. 6, 2018

(65) Prior Publication Data

US 2020/0141117 A1 May 7, 2020

(51) Int. Cl.
*E04B 9/02* (2006.01)
*H04Q 1/06* (2006.01)
(Continued)

(52) U.S. Cl.
CPC ............... *E04B 9/02* (2013.01); *E04B 5/48* (2013.01); *E04B 9/006* (2013.01); *E04H 1/06* (2013.01);
(Continued)

(58) Field of Classification Search
CPC ....... E04H 1/06; E04H 5/00; E04H 2005/005; E04B 9/006; F16L 3/26; H04Q 1/064
(Continued)

(56) References Cited

U.S. PATENT DOCUMENTS

| 6,322,176 B1 * | 11/2001 | Wild | H04Q 1/064 |
| | | | 108/50.02 |
| 7,586,036 B2 * | 9/2009 | Davis | E04F 15/0247 |
| | | | 174/40 CC |

(Continued)

FOREIGN PATENT DOCUMENTS

| JP | 9-23529 A | 1/1997 |
| JP | 2016-19453 A | 2/2016 |
| JP | 2016-183853 A | 10/2016 |

OTHER PUBLICATIONS

Japanese Office Action dated Jul. 9, 2019, in Patent Application No. 2019-528941, 3 pages.

(Continued)

*Primary Examiner* — Brian E Glessner
*Assistant Examiner* — Adam G Barlow
(74) *Attorney, Agent, or Firm* — Oblon, McClelland, Maier & Neustadt, L.L.P.

(57) ABSTRACT

A data center includes a floor; a side wall configured to partition a space above the floor into a room; a plurality of server columns arranged in a row direction on the floor, each of the plurality of server columns including a plurality of servers that are arranged to form a column in a column direction; an inclined ceiling that increases in height from a first side toward a second side in the column direction; and a first cable tray configured to hold a first cable, the first cable tray being provided in a space below the inclined ceiling on the first side in the column direction, and extending along the row direction.

19 Claims, 6 Drawing Sheets (51) Int. Cl.
  *E04B 5/48* (2006.01)
  *E04B 9/00* (2006.01)
  *E04H 1/06* (2006.01)
  *E04H 5/00* (2006.01)
  *F16L 3/26* (2006.01)

(52) U.S. Cl.
  CPC ................. *E04H 5/00* (2013.01); *F16L 3/26* (2013.01); *H04Q 1/064* (2013.01); *E04H 2005/005* (2013.01)

(58) Field of Classification Search
  USPC .......................... 52/220.5, 220.7, 263, 302.1
  See application file for complete search history.

(56) References Cited

U.S. PATENT DOCUMENTS

| | | | | |
|---|---|---|---|---|
| 8,320,125 | B1* | 11/2012 | Hamburgen | H05K 7/2079 361/695 |
| 9,572,288 | B2* | 2/2017 | Wilcox | H05K 7/1491 |
| 10,244,652 | B1* | 3/2019 | Czamara | H05K 7/20745 |
| 10,413,764 | B2* | 9/2019 | Cutting | A62C 35/58 |
| 10,460,589 | B1* | 10/2019 | Srinivasan | G08B 21/182 |
| 2008/0060790 | A1* | 3/2008 | Yates | F16F 7/14 165/80.3 |
| 2008/0062647 | A1* | 3/2008 | Hillis | H05K 7/1497 361/699 |
| 2011/0185750 | A1* | 8/2011 | Oki | H05K 7/20827 62/89 |
| 2011/0220324 | A1* | 9/2011 | Lindenstruth | E04H 5/02 165/104.19 |
| 2012/0132554 | A1* | 5/2012 | Wei | H05K 7/1497 206/320 |
| 2013/0040547 | A1 | 2/2013 | Moore | |
| 2013/0244563 | A1* | 9/2013 | Noteboom | H05K 7/20309 454/250 |
| 2014/0213169 | A1* | 7/2014 | Rasmussen | H05K 7/1497 454/237 |
| 2014/0230346 | A1* | 8/2014 | Blumberg | E04B 1/344 52/143 |
| 2014/0259966 | A1* | 9/2014 | Totani | H05K 7/20709 52/1 |
| 2014/0298734 | A1* | 10/2014 | Rogers | E04B 1/343 52/79.9 |
| 2016/0110916 | A1* | 4/2016 | Eikhoff | G06T 17/20 345/420 |
| 2019/0159365 | A1* | 5/2019 | Snip | H05K 7/20745 |
| 2020/0056392 | A1* | 2/2020 | Harinck | H05K 7/1488 |

OTHER PUBLICATIONS

International Search Report dated Mar. 26, 2019, in PCT/JP2019/007061, 3 pages.

* cited by examiner

DATA CENTER

BACKGROUND OF THE INVENTION

1. Field of the Invention

The present invention relates to a data center.

2. Description of the Related Art

Conventionally, there is known a cabinet system in which cables, etc., are installed. The cabinet system is assembled by combining a plurality of cabinet modules (for example, see Patent Document 1).

Patent Document 1: U.S. Pat. No. 6,322,176

However, for the conventional cabinet system, no particular method has been devised with respect to the positional relationship between servers and the cables, etc., that are connected to the servers. When such a cabinet system is used in a facility where multiple servers are disposed, such as in a data center, the cables may be affected by the heat generated by the servers. Thus, problems may occur such as deterioration of the cables or a decrease in the maintenance efficiency due to the heated cables.

SUMMARY OF THE INVENTION

An aspect of the present invention provides a data center in which one or more of the disadvantages of the related art are reduced.

According to one aspect of the present invention, there is provided a data center including a floor; a side wall configured to partition a space above the floor into a room; a plurality of server columns arranged in a row direction on the floor, each of the plurality of server columns including a plurality of servers that are arranged to form a column in a column direction; an inclined ceiling that increases in height from a first side toward a second side in the column direction; and a first cable tray configured to hold a first cable, the first cable tray being provided in a space below the inclined ceiling on the first side in the column direction, and extending along the row direction.

DETAILED DESCRIPTION OF THE PREFERRED EMBODIMENTS

Embodiments to which the data center according to the present invention is applied, will be described below.

Embodiment

Figure 1:
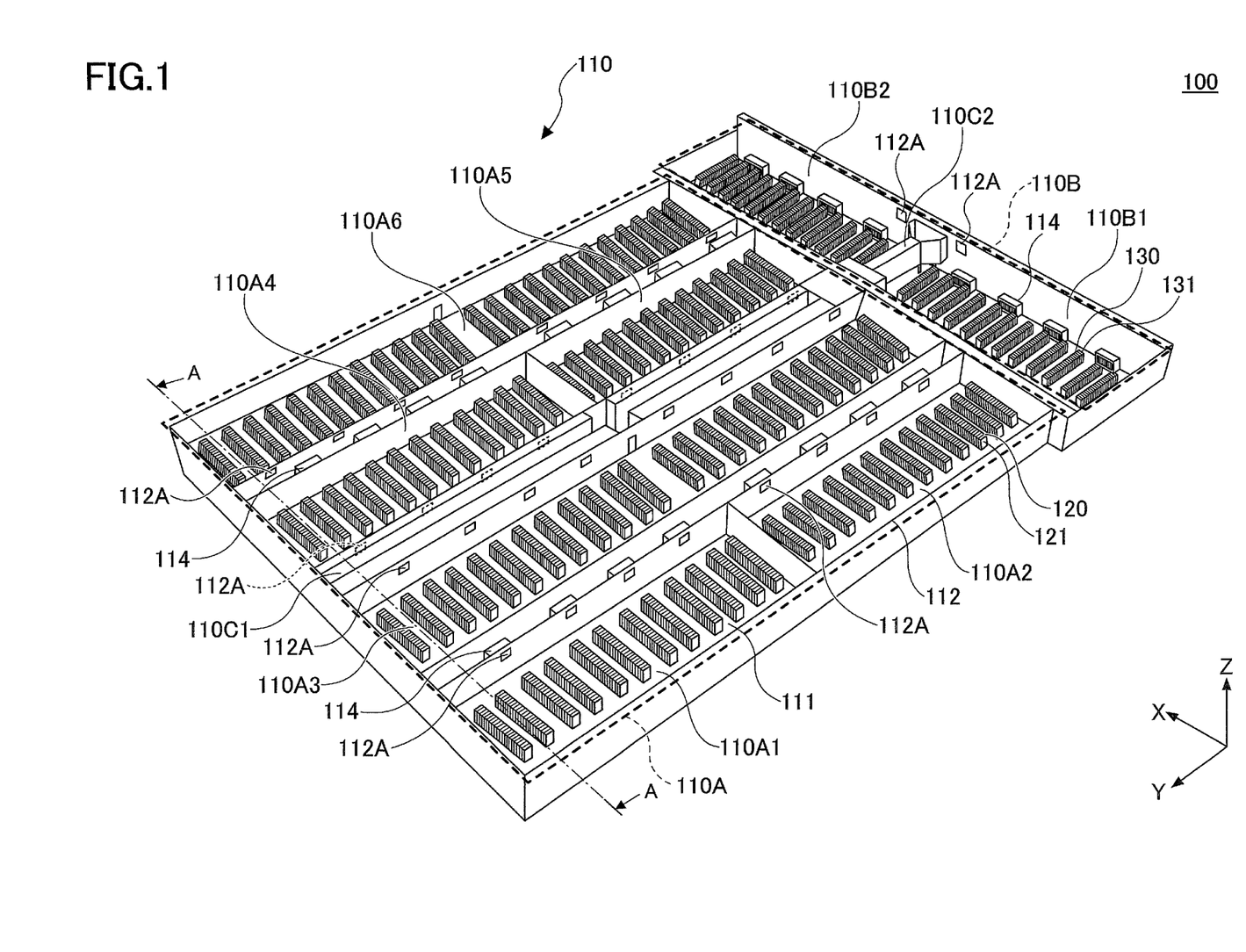
FIG. 1 is a diagram illustrating a data center.
Figure 2:
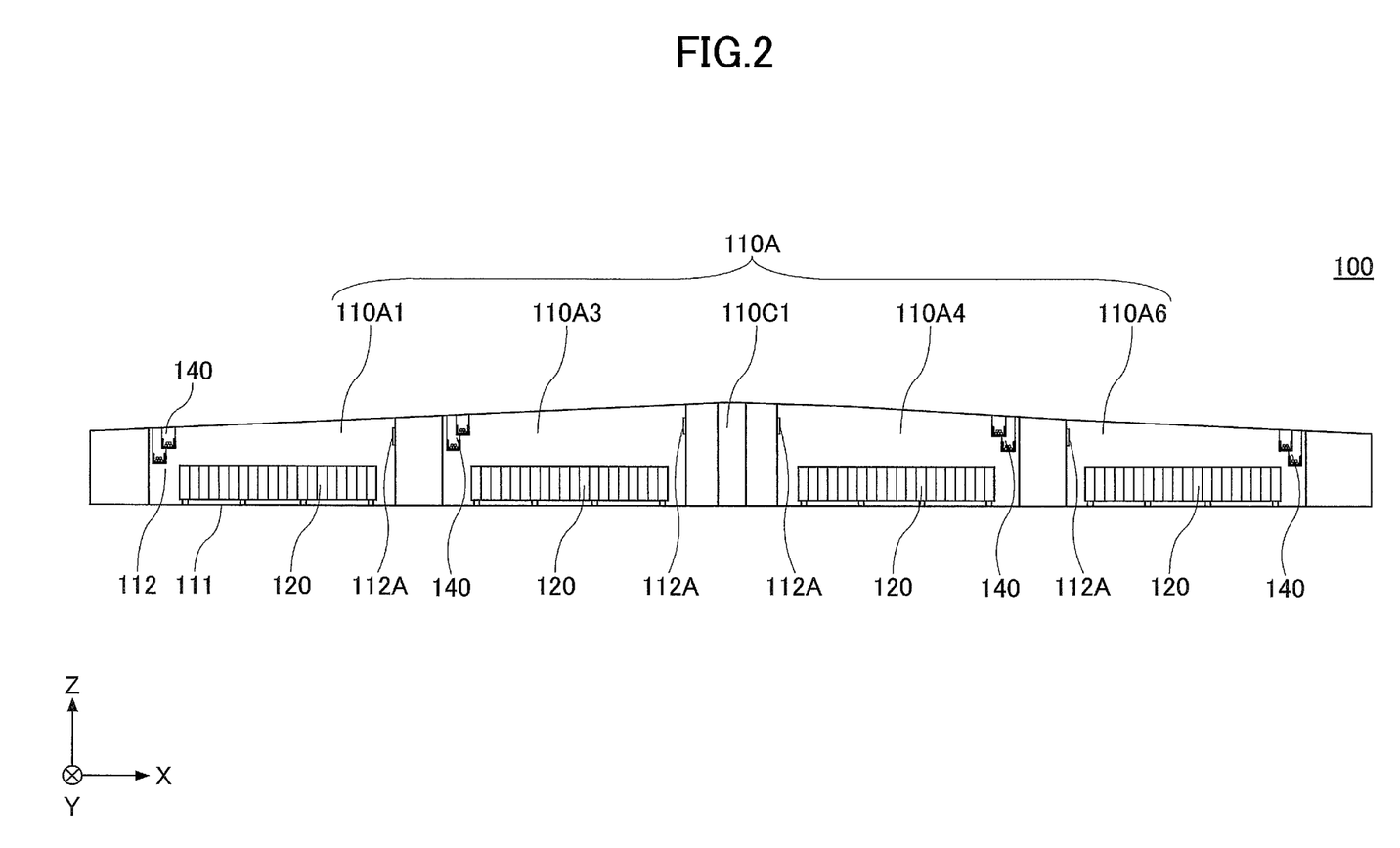
FIG. 2 is a cross-sectional view taken along a line A-A in FIG. 1.

FIG. 1 is a diagram illustrating a data center 100. FIG. 2 is a cross-sectional view taken along a line A-A in FIG. 1.

The following description will be made by using a XYZ coordinate system. The Z axis positive direction is a vertically upward direction.

The data center 100 includes a building 110, a plurality of server columns 120, a plurality of UPS (Uninterruptible Power Supply) columns 130, and a plurality of cable trays 140.

The building 110 includes a floor 111, side walls 112, an inclined ceiling 113, and cooling devices 114. In FIG. 1, the inclined ceiling 113 is omitted. The building 110 includes rooms 110A1, 110A2, 110A3, 110A4, 110A5, 110A6, 110B1, and 110B2, and corridors 110C1 and 110C2, surrounded by the floor 111, the side walls 112, and the inclined ceiling 113.

The rooms 110A1 to 110A6 and the corridor 110C1 are included in a server zone 110A. The server zone 110A includes the six rooms 110A1 to 110A6 for disposing rack type servers, and the corridor 110C1 leading to the rooms 110A1 to 110A6.

The rooms 110A1 and 110A2, and the rooms 110A4 and 110A5, are respectively partitioned by the side wall 112 at the center in the Y axis direction of the server zone 110A. The rooms 110A3 and 110A6 extend from the end portion in the Y axis negative direction to the end portion in the Y axis positive direction of the server zone 110A. Therefore, the sizes of the rooms 110A1, 110A2, 110A4, and 110A5 are half the size of the rooms 110A3 and 110A6.

Note that the power that can be supplied to each of the rooms 110A1, 110A2, 110A4, and 110A5 is 2 MW. Furthermore, the power that can be supplied to each of the rooms 110A3 and 110A6 is 4 MW.

That is, the total power supplied to the rooms 110A1, 110A2, and 110A3 on the X axis negative direction side relative to the corridor 110C1 is 8 MW, and the total power supplied to the rooms 110A4, 110A5, and 110A6 on the X axis positive direction side relative to the corridor 110C1 is 8 MW.

In this way, by equalizing the total power supplied to the rooms 110A1, 110A2, and 110A3 and the total power supplied to the rooms 110A4, 110A5, and 110A6 on both sides of the corridor 110C1, it is intended to equalize the power generation amount on both sides of the corridor 110C1. Note that all of the server columns 120 are supplied with power that is taken in from the outside of the data center 100 and that is supplied via the UPS columns 130.

Furthermore, the rooms 110B1 and 110B2 and the corridor 110C2 are included in a power supply zone 110B. The power supply zone 110B includes the rooms 110B1 and 110B2 in which a plurality of the UPS columns 130 are disposed, and the corridor 110C2 disposed between the rooms 110B1 and 110B2.

The corridors 110C1 and 110C2 extend along the Y axis, and windows are provided in the corridors 110C1 and 110C2 so that the inside of the rooms 110A3, 110A4, 110A5, 110B1, and 110B2 can be seen. Therefore, it is possible to see inside the rooms 110A3, 110A4, 110A5, 110B1, and 110B2 illuminated by LED (Light Emitting Diode) lighting from the corridors 110C1 and 110C2, as if seen in a showcase. The corridors 110C1 and 110C2 have a shape that is line symmetric with respect to a central axis that is parallel to the Y axis that passes through the center of the width in the X axis direction in a planar view.

The floor 111 is provided in the entire building 110 in a planar view. The floor 111 has a double floor structure, and a mesh-like mesh floor is provided on the bottom floor.

The side walls 112 partition the space above the floor 111 into the rooms 110A1 to 110A6, 110B1 and 110B2, and the corridors 110C1 and 110C2. Furthermore, two side walls 112 are provided between the server zone 110A and the power supply zone 110B, and there is a space between the two side walls 112. The side wall 112 extends from the bottom floor of the floor 111 to the inclined ceiling 113 in the Z axis direction.

The side wall 112 includes exhaust ports 112A. The hot air that is collected from the exhaust ports 112A is circulated within the data center 100, cooled at the cooling devices 114, and then supplied again as cold air under the floor of the server zone 110A. Furthermore, the hot air that is collected from the exhaust ports 112A may be discharged outside through an outdoor machine installed on the roof.

In the rooms 110A1, 110A2, and 110A3, the exhaust ports 112A are provided directly below the inclined ceiling 113 in the side walls 112 extending in the Y axis direction, on the side (on the X axis positive direction side) where the inclined ceiling 113 is highest. In the rooms 110A4, 110A5, and 110A6, the exhaust ports 112A are provided directly below the inclined ceiling 113 in the side walls 112 extending in the Y axis direction, on the side (on the X axis negative direction side) where the inclined ceiling 113 is highest.

Furthermore, in the room 110B1, the exhaust port 112A is provided in the side wall 112 on the Y axis negative direction side, directly below the inclined ceiling 113 at the end portion on the X axis positive direction side where the inclined ceiling 113 is highest. Note that in the case where there is an exhaust mechanism, which is connected to the outside air, in the side wall 112 at the boundary between the room 110B1 and the rooms 110A2 and 110A3, in the room 110B1, the exhaust port 112A may also be provided in the side wall 112 on the Y axis positive direction side, directly below the inclined ceiling 113, at the end portion on the X axis positive direction side where the inclined ceiling 113 is highest.

The exhaust ports 112A provided in the side wall 112 extending in the Y axis direction on the X axis positive direction side inside the rooms 110A1 to 110A3, and the exhaust ports 112A provided in the side wall 112 extending in the Y axis direction on the X axis negative direction side inside the rooms 110A4 to 110A6, are bilaterally symmetric with respect to the corridor 110C1, and are provided at the highest position of the inclined ceiling 113 in each of the rooms.

The hot air, which has taken away the heat from the server columns 120, is guided to the higher side along the inclination of the inclined ceiling 113, and therefore the hot air is collected from the exhaust port 112A provided in the side wall 112, at the highest portion of the inclined ceiling 113.

The inclined ceiling 113 is connected to the upper end of the side wall 112. The inclined ceiling 113 is provided below the roof of the building 110. Here, the roof is omitted. The height of the inclined ceiling 113 is highest at the corridors 110C1 and 110C2, and becomes lower toward the X axis positive direction and the X axis negative direction than at the corridors 110C1 and 110C2. The height of the inclined ceiling 113 is lowest at the end in the X axis positive direction and at the end in the X axis negative direction of the building 110. Therefore, when the building 110 is viewed from the side in the Y axis direction, the inclined ceiling 113 rises toward the center.

The cooling device 114 has a function of an air conditioner for cooling the outside air, and blows the cooled air.

The cooling devices 114 for cooling the rooms 110A1 to 110A6 are disposed between the two side walls 112 that are between the rooms 110A1 and 110A2 and the room 110A3, and disposed between the two side walls 112 that are between the rooms 110A4 and 110A5 and the room 110A6. The cooling device 114 is configured to blow air from both sides in the X axis direction, into the portion between the bottom floor and the mesh floor of the double structure floor 111, in the X axis direction. In FIG. 1, the mesh floor is illustrated as the server zone 110A, and therefore the air outlets are not visible.

Furthermore, the cooling devices 114 for cooling the rooms 110B1 and 110B2 are disposed along the side walls 112 on the Y axis positive direction side and the Y axis negative direction side inside the rooms 110B1 and 110B2. The cooling device 114 on the Y axis positive direction side has the air outlet 114A for blowing air on the Y axis negative direction side, and the cooling device 114 on the Y axis negative direction side has the air outlet 114A for blowing air on the Y axis positive direction side. The cooling devices 114 in the rooms 110B1 and 110B2 blow air in the Y axis direction.

The plurality of server columns 120 are arranged inside the rooms 110A1 to 110A6. Each server column 120 has an island shape that is long in the X axis direction and short in the Y axis direction in a planar view. The reason why the server column 120 has an island shape in the planar view is that a plurality of rack servers 121 are disposed side by side in the X axis direction. The rack server 121 is an example of a rack type information processing apparatus.

The intervals in the Y axis direction between the server columns 120 inside the rooms 110A1 to 110A6 are equal, and the center of the length in the X axis direction of each server column 120 matches the center of the length in the X axis direction of each of the rooms 110A1 to 110A6. This is to equalize the heat radiation and the cooling of the server columns 120.

The number of the rack servers 121 included in each server column 120 is, for example, 10 to 20. When the number of the rack servers 121 included in the server column 120 is 10, ten rack servers 121 are disposed adjacent to each other in the X axis direction. Furthermore, for example, in each rack server, 10 to 20 servers are held in a rack and are disposed in an overlapping manner in the Z axis direction.

Note that as an example, the number of the server columns 120 arranged in the Y axis direction in the rooms 110A1, 110A2, 110A4, and 110A5, is 20 to 30, and the number of server columns 120 arranged in the Y axis direction in the rooms 110A3 and 110A6 is 40 to 60. Furthermore, as one example, the number of the server columns 120 arranged in the X axis direction in the rooms 110A1 to 110A6 is one; however, the number of the server columns 120 may be plural.

The plurality of UPS columns 130 are arranged inside the rooms 110B1 and 110B2. Each of the UPS columns 130 has an island shape that is long in the Y axis direction and short in the X axis direction in a planar view. The reason why the UPS column 130 has an island shape in planar view is that a plurality of UPSs 131 are disposed side by side in the Y axis direction. The UPS 131 is an example of a heat generating device, and the UPS column 130 is an example of a heat generating device column.

The intervals in the X axis direction between the UPS columns 130 inside the rooms 110B1 and 110B2 are equal, and the center of the length in the Y axis direction of each UPS column 130 matches the center of the length in the Y axis direction of each of the rooms 110B1 and 110B2. This is to equalize the heat radiation and the cooling of the UPS columns 130.

The number of UPSs 131 included in each UPS column 130 is, for example, 10 to 20. When the number of UPSs 131 included in the UPS column 130 is 10, ten UPSs 131 are disposed adjacent to each other in the Y axis direction.

Note that as one example, the number of UPS columns 130 arranged in the X axis direction in the rooms 110B1 and 110B2 is 20 to 30. Furthermore, as one example, the number of UPS columns 130 arranged in the Y axis direction in the rooms 110B1 and 110B2 is one; however, the number of the UPS columns 130 may be plural.

Figure 3:
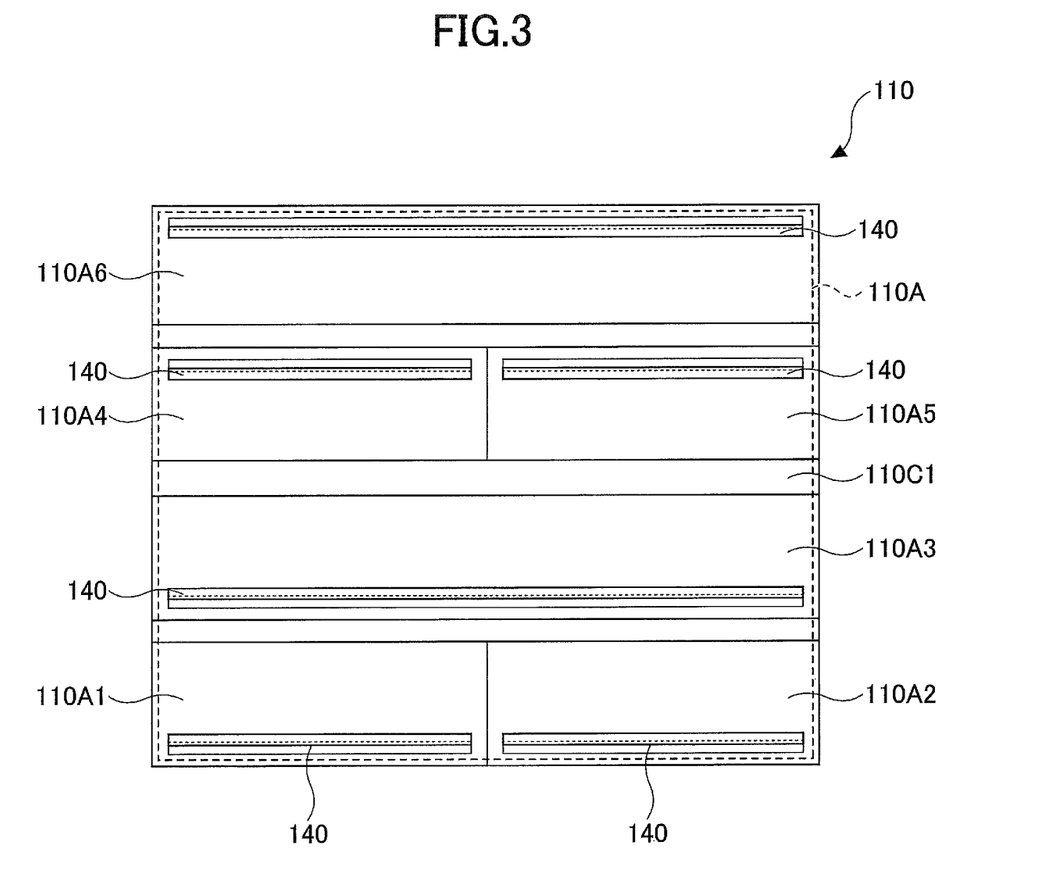
FIG. 3 is a plan view of a power supply zone.

Next, the cable trays 140 will be described. The positions of the cable trays 140 are illustrated in FIG. 2; however, the cable trays 140 are omitted in FIG. 1. Here, the cable tray 140 will be described with reference to FIG. 3 in addition to FIG. 2. FIG. 3 is a diagram illustrating the server zone 110A in the building 110.

One cable tray 140 is provided in each of the rooms 110A1 to 110A6. In each of the rooms 110A1 to 110A6, the cable tray 140 is provided in a space below the inclined ceiling 113 along the Y axis direction, at the end portion in the X axis direction, where the inclined ceiling 113 is lowest.

More specifically, in the rooms 110A1 to 110A3, the cable tray 140 is provided in a space below the inclined ceiling 113 along the Y axis direction at the end portion on the X axis negative direction side, where the inclined ceiling 113 is lowest. Furthermore, in the rooms 110A4 to 110A6, the cable tray 140 is provided in a space below the inclined ceiling 113 along the Y axis direction at the end portion on the X axis positive direction side where the inclined ceiling 113 is lowest.

The cable tray 140 is connected to the server columns 120 from the upper side (the Z axis positive direction side). Under such an assumption, the lowest position of the inclined ceiling 113 is a location where the hot air blown up from the server columns 120 is least likely to be accumulated in the space below the inclined ceiling 113, and therefore this location is convenient in terms of suppressing the temperature rise of the cables held in the cable tray 140.

The cable tray 140 holds cables connected to the respective rack servers 121 in the server column 120. The cables include optical fiber cables and power cables. Furthermore, the cable may include a UTP (Unshielded Twist Pair) cable. The optical fiber cable and the UTP cable are cables for data communication. The power cable is a cable that supplies power to each rack server 121. Details of the cable tray 140 will be described below.

Note that in the following description, in the server zone 110A, the direction (X axis direction) in which a plurality of the rack servers 121 are arranged in the server column 120 is referred to as a column direction, and the direction (Y axis direction) in which the plurality of server columns 120 are arranged is referred to as a row direction. Next, the configuration of the server zone 110A will be described. The rooms 110A1 to 110A6 are bilaterally symmetric with respect to the corridor 110C1 when viewed from the Y axis direction. That is, when viewed from the Y axis direction, the rooms 110A1 to 110A6 are line symmetric, with a straight line passing in the Z axis direction through the center of the corridor 110C1 in the X axis direction, as the axis of symmetry. The rooms 110A1 and 110A2 are examples of a first room, and in this case, the room 110A6 is an example of a second room. Furthermore, the room 110A3 is an example of a first room, and in this case, the rooms 110A4 and 110A5 are examples of a second room.

With respect to the room 110A1 and the room 110A6, the side wall 112, the exhaust port 112A, the inclined ceiling 113, the cooling device 114, the air outlet 114A, and the plurality of server columns 120 are bilaterally symmetric with respect to the corridor 110C1 as viewed from the Y axis direction. With respect to the room 110A3 and the room 110A4, the side wall 112, the exhaust port 112A, the inclined ceiling 113, the cooling device 114, the air outlet 114A, and the plurality of server columns 120 are bilaterally symmetric with respect to the corridor 110C1 as viewed from the Y axis direction. The meaning of bilateral symmetry is the same as that for the rooms 110A1 to 110A6.

As described above, the bilaterally symmetric arrangement is used for equalizing the cooling properties of all of the server columns 120 in the server zone 110A.

Furthermore, the power consumption of the plurality of server columns 120 in each of the rooms 110A1, 110A2, 110A4, and 110A5 is 2 MW, and the power consumption of the plurality of server columns 120 in in each of the rooms 110A3 and 110A6 is 4 MW, and therefore the power consumption of the plurality of server columns 120 is bilaterally symmetric with respect to the corridor 110C1.

As described above, the power consumption of the server columns 120 disposed in the rooms 110A1 to 110A6 is made to be bilaterally symmetric with respect to the corridor 110C1, in order to equalize the heat radiation of the server columns 120 in the server zone 110A.

The data center 100 has a bilaterally symmetric configuration as described above, and therefore the configuration relating to the room 110A1 will be described below.

The inclined ceiling 113 is inclined so as to become higher from the X axis negative direction side toward the X axis positive direction side in the room 110A1. In the room 110A1, the X axis negative direction side is an example of a first side and the X axis positive direction side is an example of a second side.

Figure 4:
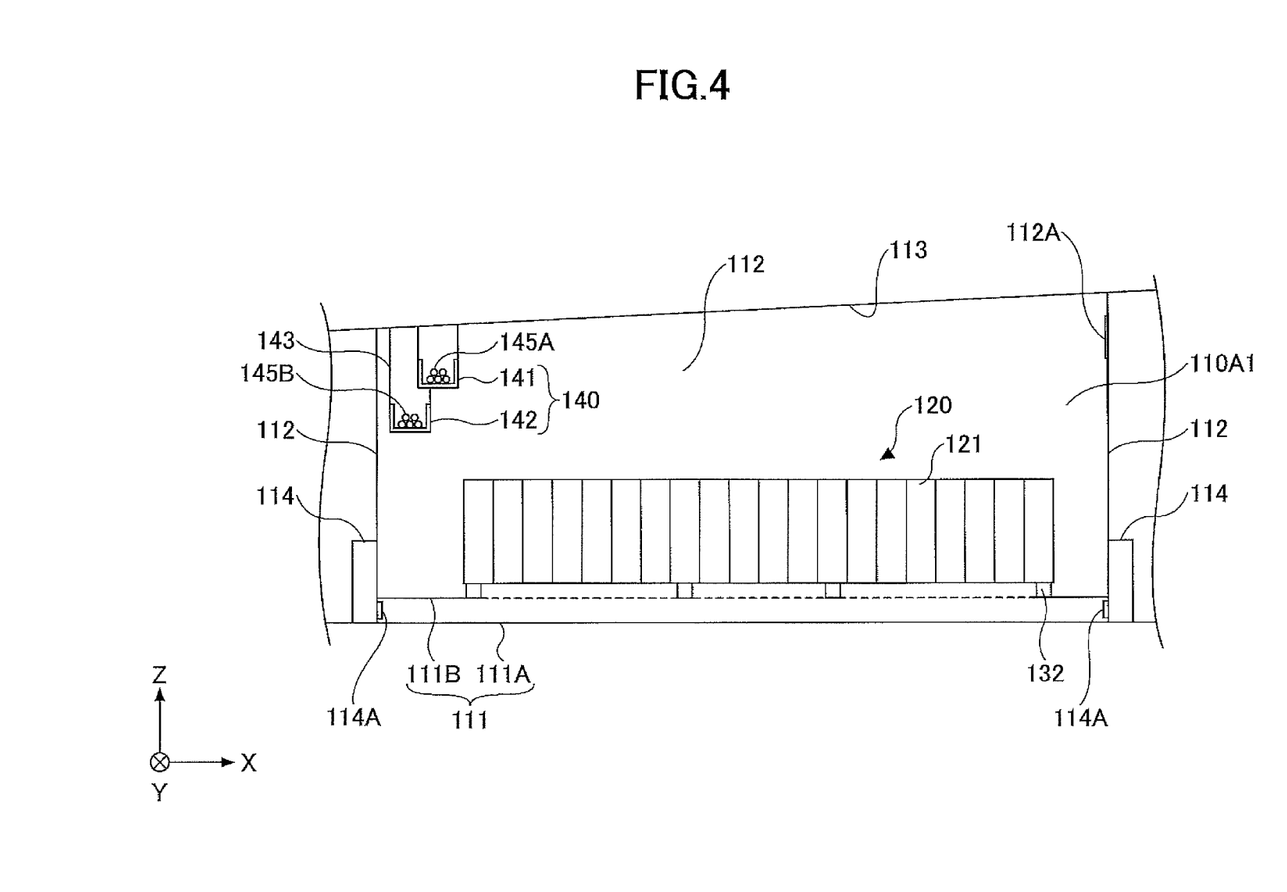
FIG. 4 is a diagram illustrating an installation structure of server columns and a double floor structure.

As illustrated in FIG. 4, the server column 120 is disposed on a mesh floor 111B on the upper stage of the floor 111 having a double floor structure, via slabs 132. Air is supplied to the server column 120 from the bottom side through the mesh of the mesh floor 111B, and the air is blown to the bottom surface of the server column 120 upon passing between the slabs 132. The air blown to the server column 120 from the bottom surface side passes through gaps, etc., of the server column 120, takes away the heat of the server column 120, and comes out from the upper side (Z axis positive direction side) of the server column 120.

The plurality of the server columns 120 are arranged in the Y axis direction, and each of the server columns 120 includes a plurality of the rack servers 121 arranged in a column. The plurality of the server columns 120 all have equal heights, as an example.

Therefore, the clearance between each of the plurality of the server columns 120 and the inclined ceiling 113 increases from the X axis negative direction side toward the X axis positive direction side. The air that takes away the heat from the server column 120 and that is blown upward from the bottom of the server column 120, is guided from the lower side to the higher side of the inclined ceiling 113. Therefore, hot air is guided to the higher side of the inclined ceiling 113. That is, hot air is collected at the higher side of the inclined ceiling 113.

Therefore, the clearance between the server column 120 and the inclined ceiling 113 is increased at the higher side of the inclined ceiling 113, to provide a space capable of collecting hot air.

Furthermore, the intervals between two adjacent server columns 120 in the Y axis direction are all equal. This is for equalizing the cooling efficiency of the plurality of server columns 120 in the Y axis direction.

The cooling device 114 is an example of an air blower and is disposed on the X axis positive direction side with respect to the plurality of server columns 120, and includes an air outlet 114A. The cooling device 114 blows air in the X axis direction from the air outlet 114A. A plurality of the cooling devices 114 are disposed in the Y axis direction between two side walls 112 on the X axis positive direction side. Therefore, the cooling devices 114 are positioned outside the room 110A1.

The cooling device 114 blows cooling air at a predetermined temperature lower than the room temperature. As illustrated in FIG. 4, the cooling device 114 includes the air outlet 114A provided between a bottom floor 111A and the mesh floor 111B of the floor 111 having a double floor structure. As illustrated in FIG. 4, a height difference is provided between the air outlet 114A and the bottom floor 111A. The height difference is an interval in the height direction and is about 1 inch to several inches.

In this way, by disposing the air outlets 114A at positions higher than the bottom floor 111A, the air blown from the air outlets 114A blows down to the bottom floor 111A, and air can be supplied even further. Furthermore, when water or dust accumulates on the bottom floor 111A, entry of water or dust into the cooling device 114 can be suppressed.

The air outlets 114A are disposed on the X axis positive direction side of the server columns 120, and blows air from the X axis positive direction side. Therefore, air is efficiently introduced between the adjacent server columns 120, and all the server columns 120 can be efficiently cooled.

The height from the bottom floor 111A of the floor 111 to the upper end of the air outlet 114A is set to be less than half the height between the bottom floor 111A and the inclined ceiling 113. Therefore, air can be blown mainly to the lower side of the server columns 120, and all the server columns 120 can be efficiently cooled.

Furthermore, the exhaust port 112A is provided at a position directly below the inclined ceiling 113, in the side wall 112 extending in the Y axis direction, at the end portion where the inclined ceiling 113 is highest in the X axis direction. Directly below the inclined ceiling 113 means a position as high as possible at a position lower than the inclined ceiling 113.

By providing the exhaust port 112A at a position that is as high as possible, hot air guided to the highest position of the inclined ceiling 113 can be efficiently collected from the exhaust port 112A.

When installing the exhaust ports 112A, restrictions may arise due to the internal structure of the side wall 112 and the internal structure of the inclined ceiling 113. Therefore, the height of the exhaust port 112A is preferably greater than or equal to the height of the inclined ceiling 113 on the X axis negative direction side. This is because if the exhaust port 112A is positioned higher than the lowest part of the inclined ceiling 113, the hot air can be efficiently collected from the exhaust port 112A.

Furthermore, in this case, it will suffice if the upper end of the exhaust port 112A is greater than or equal to the height of the inclined ceiling 113 on the X axis negative direction side. This is because if the upper end of the exhaust port 112A is higher than the lowest part of the inclined ceiling 113, hot air can be efficiently collected from the exhaust port 112A.

As described above, the inclined ceiling 113 becomes higher from the X axis negative direction side toward the X axis positive direction side, and therefore when the air is blown upward (Z axis positive direction side) from the bottom (Z axis negative direction side) of the server column 120, the air cools the server column 120, and then the heated air is guided to the higher side of the inclined ceiling 113.

Next, the details of the cable tray 140 will be described. As illustrated in FIGS. 3 and 4, the cable tray 140 is provided in a space below the inclined ceiling 113 along the Y axis direction at the end portion in the X axis negative direction where the inclined ceiling 113 is lowest.

The cable tray 140 is located as described above because the lowest position of the inclined ceiling 113 is a location where the hot air, which has cooled the server columns 120, is unlikely to be accumulated, and therefore this location is convenient in terms of suppressing the temperature rise of the cables held in the cable tray 140.

The cable tray 140 is hung from the inclined ceiling 113 and does not contact the side wall 112. That is, the cable tray 140 is suspended. If the cable tray 140 contacts the side wall 112 or the inclined ceiling 113, there is a possibility that the temperature of the cable tray 140 will rise due to heat conduction from the side wall 112 or the inclined ceiling 113 whose temperature has been increased by the hot air. Therefore, by hanging the cable tray 140 in the air having specific heat that is lower than that of the side wall 112 or the inclined ceiling 113, a temperature rise of the cables is suppressed.

Furthermore, the height of the cable tray 140 is higher than the height of the plurality of server columns 120. The part below the cable tray 140 serves as a passage for workers, etc., in the room 110A1. By disposing the cable tray 140 at a position higher than the server columns 120, it is possible to obtain a sufficient height of the passage below the cable tray 140, and when performing maintenance on the server columns 120, the cable tray 140 will not get in the way.

Furthermore, by disposing the cable tray 140 at a location where the inclined ceiling 113 is lowest and where the hot air is unlikely to accumulate, the worker can comfortably perform maintenance work without being hot.

Furthermore, the cable tray 140 includes sub-trays 141 and 142. The sub-trays 141 and 142 are made of metal, for example; however, the sub-trays 141 and 142 may be made of a resin. As illustrated in FIG. 4, the sub-trays 141 and 142 have different heights, and the positions differ in planar view. In FIG. 4, as an example, the position of the sub-tray 142 is lower than the position of the sub-tray 141, and differs from the position of the sub-tray 141 in the X axis direction in planar view. The sub-trays 141 and 142 are hung from the inclined ceiling 113 by wire 143. The sub-tray 141 is an example of a first cable tray, and the sub-tray 142 is an example of a second cable tray.

Furthermore, the sub-tray 141 holds power cables 145A, and the sub-tray 142 holds optical fiber cables 145B. The power cable 145A is an example of a first cable, and is a power cable in which the outer periphery of a metal cable is covered with an insulator. The optical fiber cable 145B is an example of a second cable, and is an optical fiber cable in which the outer peripheral portion of the optical fiber is covered with a protective layer.

The reason why the cable tray 140 is divided into the two sub-trays 141 and 142 is for separating the power cables 145A from the optical fiber cables 145B of a network system. The sub-trays 141 and 142 are separated in consideration of differences in the generated heat amount and maintainability.

The reason why the sub-tray 141 that holds the power cables 145A is disposed at a higher position than the sub tray 142 that holds the optical fiber cables 145B, is to dispose the power cables 145A, which generate a larger amount of heat than the optical fiber cables 145A, at a higher position, in order to reduce the influence of the heat generated by the power cables 145A on the optical fiber cables 145B.

Note that the colors of the power cable 145A and the optical fiber cable 145B are different from each other, and the colors of the power cable 145A and the optical fiber cable 145B are also different from the color of the side wall 112. As an example, the power cable 145A is yellow and the optical fiber cable 145B is white. These colors are used so that the power cable 145A and the optical fiber cable 145B can be distinguished from each other by color, and the power cable 145A and the optical fiber cable 145B can also be distinguished from the side wall 112 by color.

Figure 5:
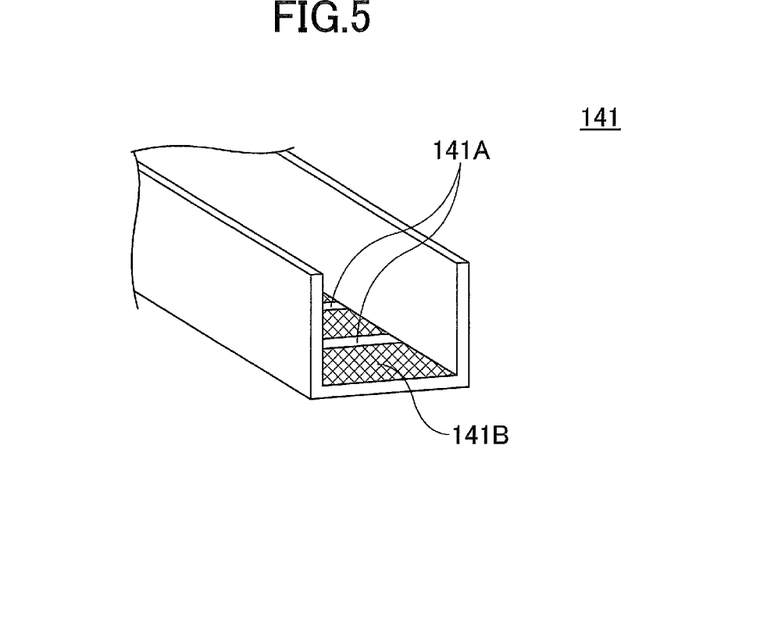
FIG. 5 is a plan view of a modified example of the power supply zone.

FIG. 5 is a diagram illustrating the sub-tray 141. The sub-tray 142 has the same configuration as that of the sub-tray 141, and therefore the sub-tray 141 will be described here.

As illustrated in FIG. 5, the sub-tray 141 is a ladder-shaped tray having ladder portions 141A. The ladder portion 141A is a rod-like member that is passed in the lateral direction with respect to the longitudinal direction (Y axis direction) of the sub-tray 141 at the bottom portion of the sub-tray 141. Furthermore, the sub-tray 141 has a mesh portion 141B between the adjacent ladder portions 141. The mesh portion 141B is a mesh-like portion formed by through holes formed by punching, etc. Note that the bottom portion of the sub-tray 141 may have only the mesh portions 141B without having the ladder portions 141, or may have only the ladder portions 141A without having the mesh portion 141B.

By using the sub-tray 141 having the ladder portions 141A and the mesh portions 141B, the heat radiation performance of the power cable 145A is improved, and the temperature rise of the power cable 145A can be suppressed. This also applies to the optical fiber cable 145B held in the sub tray 142.

Therefore, by using the cable tray 140 having the sub-trays 141 and 142 as described above, the temperature rise of the power cable 145A and the optical fiber cable 145B can be suppressed.

Figure 6:
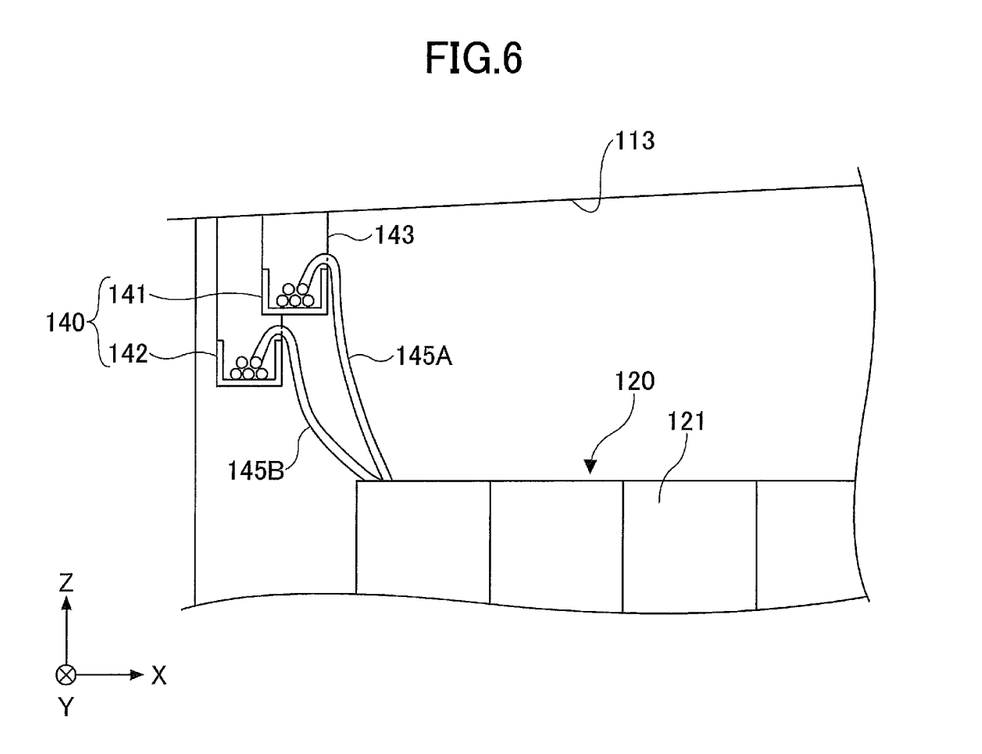
FIG. 6 is a diagram illustrating a configuration of routing cables from cable trays to a server column.

FIG. 6 is a view of a configuration of routing the power cable 145A and the optical fiber cable 145B from the cable tray 140 to the server column 120. The power cable 145A and the optical fiber cable 145B are respectively drawn out from the sub-trays 141 and 142 toward the X axis positive direction and connected to the rack servers 121. That is, the power cable 145A and the optical fiber cable 145B are drawn out from the sub-trays 141 and 142 toward a direction in which the inclined ceiling 113 is high, and are connected to the rack servers 121.

The hot air blowing up from the server column 120 toward the inclined ceiling 113 moves from the lower side to the higher side of the inclined ceiling 113, and therefore the power cable 145A and the optical fiber cable 145B, which are drawn out from the sub-trays 141 and 142, radiate heat in the moving direction of hot air with respect to the sub-trays 141 and 142.

Accordingly, it is possible to suppress the heat radiation of the power cable 145A and the optical fiber cable 145B drawn out from the sub-trays 141 and 142, from returning to the sub-trays 141 and 142, and to suppress the temperature rise of the power cable 145A and the optical fiber cable 145B.

Figure 7:
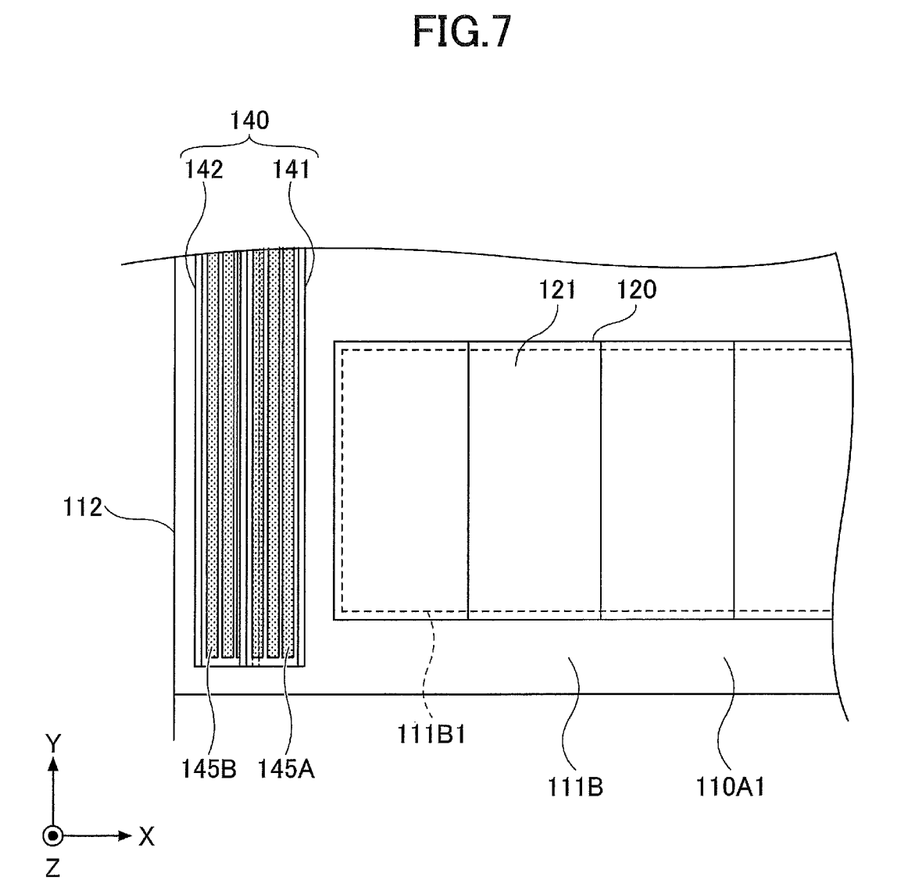
FIG. 7 is a plan view of a positional relationship between a server column and a cable tray.

FIG. 7 is a plan view of a positional relationship between the server column 120 disposed on the mesh floor 111B and the cable tray 140. The mesh floor 111B has a mesh portion 111B1 positioned under the server column 120. The mesh portion 111B1 is a meshed vent hole penetrating the mesh floor 111B in the Z axis direction.

The mesh floor 111B has no vent holes penetrating the mesh floor 111B in the Z axis direction, except for the mesh portion 111B1. This is for efficiently cooling the server column 120.

The sub-trays 141 and 142 of the cable tray 140 are disposed at positions that do not overlap the mesh portion 111B1 in planar view. The air blown up from the mesh portion 111B1 to the server column 120 passes through the inside of the server column 120 and along the side surfaces of the server column 120 extending in the XZ plane direction and the YZ plane direction, and becomes hot air and is blown up toward the inclined ceiling 113. That is, the space located above the mesh portion 111B1 in planar view becomes a space where hot air passes.

By shifting the cable tray 140 away from the space where such hot air passes in a planar view, it is possible to suppress the hot air from contacting the cable tray 140 and to suppress the temperature rise of the power cable 145A and the optical fiber cable 145B.

As described above, the cable tray 140 is disposed in the space below the lowest part of the inclined ceiling 113. The hot air, which has cooled the server column 120 in each of the rooms 110A1 to 110A6, moves from the lower side to the higher side of the inclined ceiling 113. That is, the cable tray 140 is disposed in a location where heat is unlikely to be accumulated in each of the rooms 110A1 to 110A6.

Therefore, it is possible to provide the data center 100 capable of suppressing the temperature rise of the power cable 145A and the optical fiber cable 145B.

Furthermore, the exhaust port 112A is provided at a position directly below the inclined ceiling 113, in the side wall 112 extending in the Y axis direction, at the end portion where the inclined ceiling 113 is highest in the X axis direction. Therefore, the hot air, which is guided to the highest position of the inclined ceiling 113, can be efficiently collected from the exhaust port 112A.

Furthermore, in the above description, the cable tray 140 has two sub-trays 141 and 142. However, the number of sub-trays included in the cable tray 140 may be one, or three or more. For example, in a case where the cable tray 140 has three sub-trays, UTP cables may be held in addition to the power cables 145A and the optical fiber cable 145B.

According to one embodiment of the present invention, a data center capable of suppressing the temperature rise of cables, can be provided.

The data center is not limited to the specific embodiments described in the detailed description, and variations and modifications may be made without departing from the spirit and scope of the present invention.

What is claimed is:
1. A data center comprising:
a floor;
a side wall configured to partition a space above the floor into a room;
a plurality of server columns arranged side by side with spaces between each other in a row direction on the floor, each of the plurality of server columns including a plurality of stacks of servers that are arranged as a plurality of rack servers disposed adjacent to each other to form a column, when viewed overhead above the floor, in a column direction which is parallel to a longest side of each of the columns when viewed overhead above the floor and is perpendicular to the row direction when viewed overhead above the floor;

an inclined ceiling that increases in height from a first side of the room toward a second side of the room in the column direction while the inclined ceiling has a constant height in the row direction; and a first cable tray configured to hold a first cable, the first cable tray being provided in a space below the inclined ceiling on the first side of the room, and the first cable tray extending along the row direction and perpendicular to the column direction, wherein the first cable tray is disposed at a single location with the room without being disposed directly above any of the plurality of servers.

2. The data center according to claim 1, wherein a clearance, between each of the plurality of server columns and the inclined ceiling, increases from the first side toward the second side.

3. The data center according to claim 1, further comprising:
an exhaust port that is provided in the side wall on the second side in the column direction, the exhaust port being configured to exhaust air in the room outside of the room.

4. The data center according to claim 3, wherein a height of the exhaust port is greater than or equal to a height of the inclined ceiling on the first side.

5. The data center according to claim 3, wherein the exhaust port is positioned directly below the inclined ceiling on the second side.

6. The data center according to claim 1, wherein the first cable tray is disposed at a position that is higher than the plurality of server columns in a height direction.

7. The data center according to claim 1, further comprising:
a vent hole through which air passes, the vent hole being provided on the floor, wherein
the first cable tray is disposed at a position that does not overlap the vent hole in a planar view, inside the room.

8. The data center according to claim 1, wherein the first cable tray has a shape of a ladder.

9. The data center according to claim 1, wherein
a clearance, between each of the plurality of server columns and the inclined ceiling, is smaller on the first side than on the second side in the column direction, and
the first cable tray is hung from the inclined ceiling.

10. The data center according to claim 1, wherein the first cable is drawn out from a second side of the first cable tray toward at least one of the plurality of server columns.

11. The data center according to claim 1, wherein the first cable tray does not contact the side wall.

12. The data center according to claim 1, wherein the first cable tray is formed as a mesh.

13. The data center according to claim 1, wherein the first cable tray includes a portion having a color that is different from a color of the side wall.

14. The data center according to claim 1, further comprising:
a second cable tray configured to hold a second cable, the second cable tray being provided in a space below the inclined ceiling on the first side in the column direction, wherein
the first cable tray and the second cable tray are disposed at different positions in a height direction and are disposed at different positions in a planar view.

15. The data center according to claim 14, wherein the first cable is a cable of an electric power system and the second cable is a cable of a network system.

16. A data center comprising:
a floor;
a first side wall configured to partition a space above the floor into a first room;
a plurality of first server columns arranged side by side with spaces between each other in a row direction on the floor, each of the plurality of first server columns including a plurality of stacks of servers that are arranged as a plurality of rack servers disposed adjacent to each other to form a column, when viewed overhead above the floor, in a column direction which is parallel to a longest side of each of the columns when viewed overhead above the floor and is perpendicular to the row direction when viewed overhead above the floor;
a first inclined ceiling that increases in height from a first side of the first room toward a second side of the second room in the column direction while the inclined ceiling has a constant height in the row direction;
a first cable tray configured to hold a first cable, the first cable tray being provided in a space below the first inclined ceiling on the first side of the first room, and extending along the row direction and perpendicular to the column direction, wherein the first cable tray is disposed at a single location with the first room without being disposed directly above any of the plurality of first servers;
a second side wall configured to partition a space above the floor into a second room;
a plurality of second server columns arranged side by side with spaces between each other in the row direction on the floor, each of the plurality of second server columns including a plurality of stacks of second servers that are arranged as a plurality of rack servers disposed adjacent to each other to form a column, when viewed overhead above the floor, in the column direction which is parallel to a longest side of each of the columns when viewed overhead above the floor and is perpendicular to the row direction when viewed overhead above the floor;
a second inclined ceiling that increases in height from the second side of the second room toward the first side of the second room in the column direction while the inclined ceiling has a constant height in the row direction;
a second cable tray configured to hold a second cable, the second cable tray being provided in a space below the second inclined ceiling on the second side of the second room, and extending along the row direction and perpendicular to the column direction, wherein the second cable tray is disposed at a single location with the second room without being disposed directly above any of the plurality of second servers; and
a corridor disposed between the first room and the second room.

17. The data center according to claim 16, wherein
the first inclined ceiling and the second inclined ceiling are bilaterally symmetric with respect to the corridor in a side view from the row direction,
the plurality of first server columns and the plurality of second server columns are bilaterally symmetric with respect to the corridor in a planar view and are bilaterally symmetric with respect to the corridor in a side view from the row direction, and
the first cable tray and the second cable tray are bilaterally symmetric with respect to the corridor in a side view from the row direction.

18. The data center according to claim 16, further comprising:
- a first exhaust port that is provided in the first side wall on the second side in the column direction, the first exhaust port being configured to exhaust air in the first room outside of the first room; and
- a second exhaust port that is provided in the second side wall on the first side in the column direction, the second exhaust port being configured to exhaust air in the second room outside of the second room.

19. The data center according to claim 18, wherein
- the first inclined ceiling and the second inclined ceiling are bilaterally symmetric with respect to the corridor in a side view from the row direction,
- the plurality of first server columns and the plurality of second server columns are bilaterally symmetric with respect to the corridor in a planar view and are bilaterally symmetric with respect to the corridor in a side view from the row direction,
- the first cable tray and the second cable tray are bilaterally symmetric with respect to the corridor in a side view from the row direction, and
- the first exhaust port and the second exhaust port are bilaterally symmetric with respect to the corridor in a side view from the row direction.

* * * * *